Dec. 15, 1925.
W. C. SWEENEY
1,565,827
PNEUMATIC AUTOMOBILE SEAT OR CUSHION
Filed April 14, 1925   2 Sheets-Sheet 1
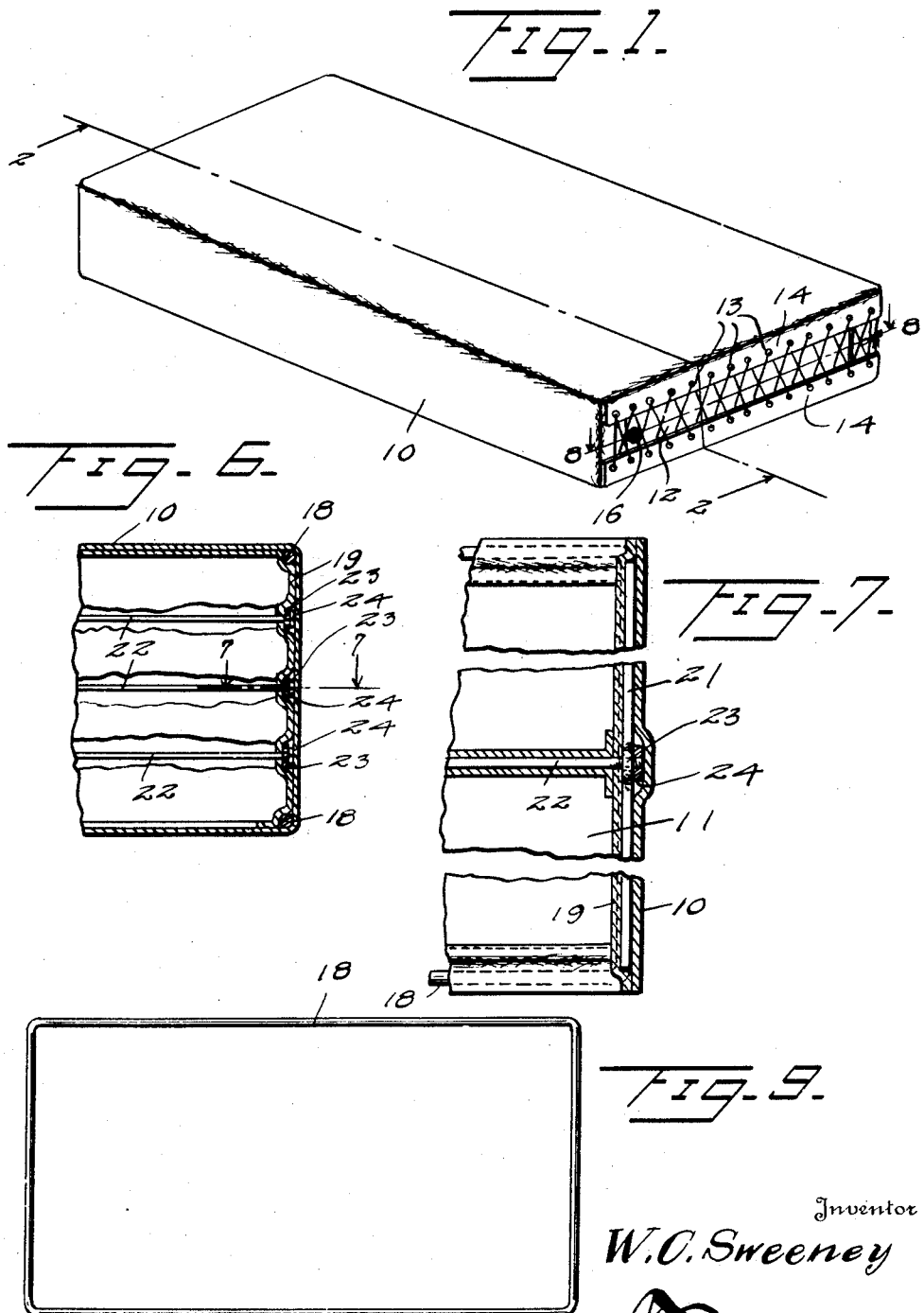
Inventor
W. C. Sweeney
Attorney

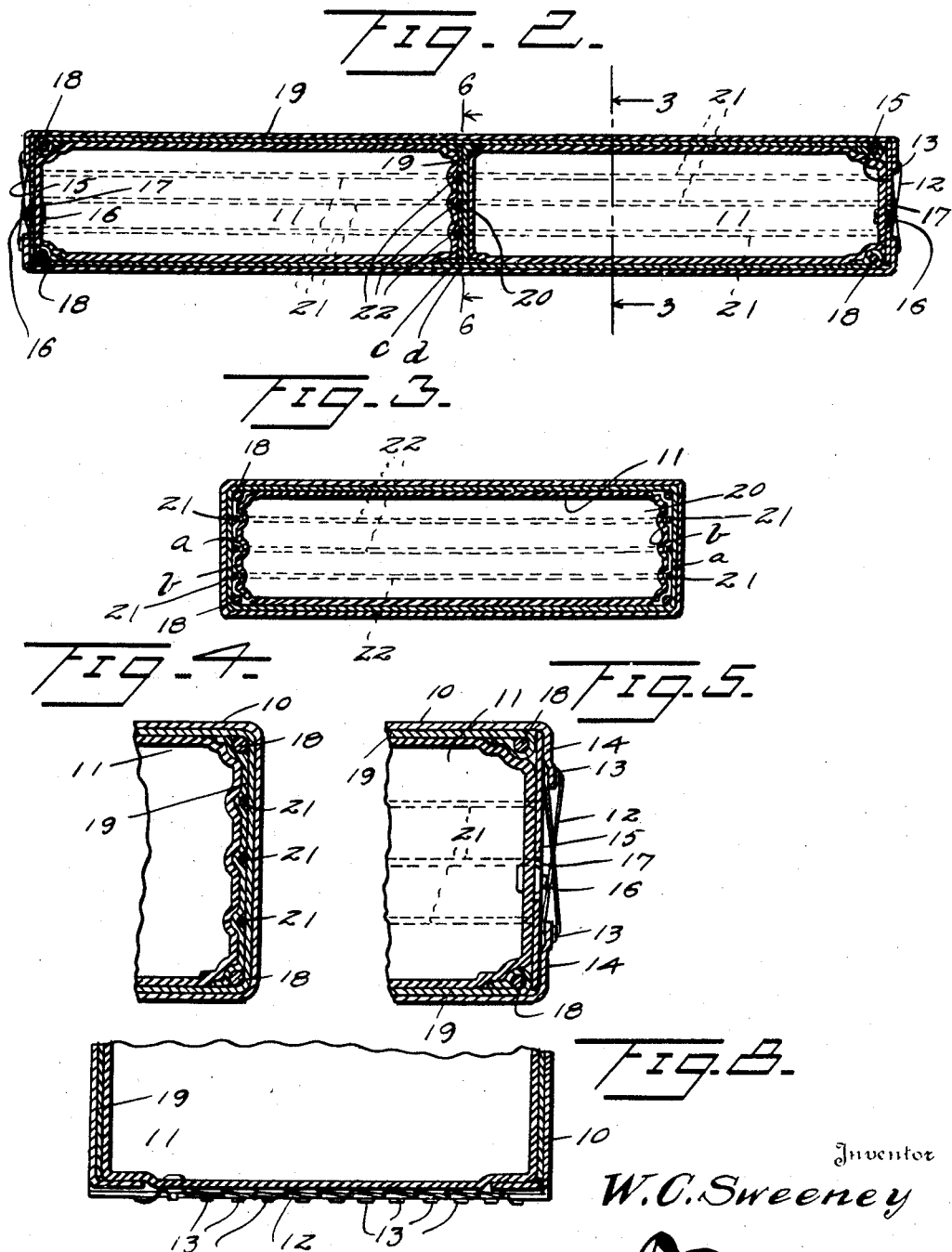

Patented Dec. 15, 1925.

1,565,827

UNITED STATES PATENT OFFICE.

WILLIAM C. SWEENEY, OF PUEBLO, COLORADO.

PNEUMATIC AUTOMOBILE SEAT OR CUSHION.

Application filed April 14, 1925. Serial No. 23,013.

*To all whom it may concern:*

Be it known that I, WILLIAM C. SWEENEY, a citizen of the United States, residing at Pueblo, in the county of Pueblo and State of Colorado, have invented certain new and useful Improvements in Pneumatic Automobile Seats or Cushions; and I do hereby declare the following to be a full, clear, and exact description of the invention, such as will enable others skilled in the art to which it appertains to make and use the same.

This invention relates to a pneumatic automobile seat or cushion.

It is aimed to provide a construction wherein individual cushions are used for each occupant of the seat so that variation in weight of occupants will not uncomfortably affect the portion of the seat occupied by the other.

Another object is to provide a novel construction comprising a casing into which pneumatic cushions are insertable and removable from opposite ends.

Still another object is to provide a novel construction wherein the casing is effectively reinforced at the sides, top and bottom and midway of its ends and particularly in such a manner as to insure retention of its shape.

Additional objects and advantages will become apparent from a consideration of the description following taken in connection with accompanying drawings illustrating an operative embodiment.

In said drawings:—

Figure 1 is a perspective view of the seat;

Figure 2 is a longitudinal sectional view taken on the line 2—2 of Figure 1;

Figure 3 is a transverse sectional view taken on the line 3—3 of Figure 2;

Figure 4 is an enlarged detail section taken through the device particularly at a side wall thereof;

Figure 5 is an enlarged detail section taken through one end of the device longitudinally;

Figure 6 is a vertical sectional view taken on the line 6—6 of Figure 2 and partly broken away to disclose the reinforcing rods;

Figure 7 is a detail sectional view taken on the line 7—7 of Figure 6, and

Figure 8 is a sectional view taken on the line 8—8 of Figure 1.

Figure 9 is a detail plan view of the rectangular reinforcing frame.

Referring specifically to the drawings, an outer casing or cover is provided for the seat as at 10, being made from leather, fabric, a combination of the two or of any desired material. This casing 10 is preferably rectangular in shape as well shown in Figure 1 and is open at its ends so that rectangular pneumatic cushions 11, identical in structure and size, may be inserted and removed. These cushions may be made of any desired material, for instance rubber or rubberized fabric in order that they may be elastic.

The ends of the casing 10 are closed in any suitable manner as by means of laces 12 passing through eyelets 13 of flaps or strips 14 thereof. Flaps 15 may also be provided at such ends, fastened along one edge to the casing and being primarily designed to prevent chafing of the cushions or envelopes 11. Air may be supplied to the envelopes in any desired way through valve stems 16, for instance of the type common in pneumatic tires, the flaps 15 having openings at 17 permitting access to said valves.

In order that the device will retain its rectangular shape, rectangular frames made of wire or the like as detailed in Figure 9 and designated 18 are arranged within the casing at top and bottom and stretched thereover and secured thereto at the top, bottom and sides is a fabric or other sheet 19. This fabric may be removable or it may be secured to the casing 10. Centrally of the device and marginally secured to the sheet 19 is a partition wall 20 of the same material which constitutes an inner stop or abutment for the envelopes 11. The sheet 19 is reinforced at its sides and the wall 20 is reinforced by a row of horizontally extending rods 21 and 22, such rods being secured together by certain of them passing through eyelets 23 on others and then receiving nuts 24, as shown in Figures 6 and 7. In order to accommodate the rods 21 and 22, the sheet 19 and wall 20 are preferably of double ply, the plies being designated *a* and *b* and *c* and *d*, respectively. The plies of the respective walls are suitably secured together, for instance by stitching.

A cushion constructed as described will have and retain a rectangular shape and may be readily collapsed or inflated when desired.

Changes may be resorted to within the spirit and scope of the invention.

I claim as my invention:

A seat of the character described comprising a casing, rectangular frames within the casing adjacent the top and bottom, a sheet covering said frame at top and bottom and at the sides, a partition midway of the ends of said sheet and secured thereto, the side walls of said sheet and said partition being double ply, reinforcing elements located between the said plies, pneumatic cushions disposed within the sheet in abutment with said partition, the ends of said casing constituting closures and comprising flaps, said flaps having eyelets, laces coacting with said eyelets, and chafing flaps inwardly of said flaps, said chafing flaps having openings to facilitate access to the valve means of said cushions.

In testimony whereof I affix my signature.

WILLIAM C. SWEENEY.